United States Patent
Tomita

[11] Patent Number: 5,099,355
[45] Date of Patent: Mar. 24, 1992

[54] OPTICAL ELEMENT HAVING HEAT CONTROL MEANS

[75] Inventor: Kan Tomita, Tokyo, Japan

[73] Assignee: Ricoh Company, Ltd., Tokyo, Japan

[21] Appl. No.: 590,129

[22] Filed: Sep. 28, 1990

[30] Foreign Application Priority Data

| Oct. 2, 1989 | [JP] | Japan | 1-257555 |
| Oct. 2, 1989 | [JP] | Japan | 1-257556 |
| Jun. 4, 1990 | [JP] | Japan | 2-145914 |

[51] Int. Cl.⁵ .................. G02B 5/30; G02F 1/01
[52] U.S. Cl. ........................ 359/246; 359/254; 359/288
[58] Field of Search .......... 350/355, 379, 392, 353

[56] References Cited

U.S. PATENT DOCUMENTS

| 3,402,001 | 9/1968 | Fleisher | 350/379 |
| 4,323,297 | 4/1983 | Kawamura et al. | 350/6.8 |
| 4,466,701 | 8/1984 | Ogata et al. | 350/336 |
| 4,466,703 | 8/1984 | Nishimoto | 350/379 |
| 4,589,735 | 5/1986 | Saunders | 350/280 |
| 4,614,408 | 9/1986 | Mir et al. | 350/379 |
| 4,733,064 | 3/1988 | Ishikawa | 350/6.8 |
| 4,756,604 | 7/1988 | Nakatsuka et al. | 350/331 R |
| 4,762,397 | 8/1988 | Pepper | 350/347 V |
| 4,872,743 | 10/1989 | Saba et al. | 350/353 |
| 4,896,948 | 1/1990 | Dono et al. | 350/347 V |
| 4,915,484 | 4/1990 | Yamamoto | 350/6.8 |
| 4,916,318 | 4/1990 | Iima | 350/6.8 |
| 4,919,520 | 4/1990 | Okada et al. | 350/347 R |
| 5,020,885 | 6/1991 | Shibaguchi | 350/355 |

FOREIGN PATENT DOCUMENTS

| 61-184515 | 8/1986 | Japan | 350/6.8 |
| 151824 | 7/1987 | Japan . | |
| 230017 | 9/1989 | Japan | 350/355 |

*Primary Examiner*—Eugene R. LaRoche
*Assistant Examiner*—Michael B. Shingleton
*Attorney, Agent, or Firm*—Oblon, Spivak, McClelland, Maier & Neustadt

[57] ABSTRACT

An optical element that has a heat control unit comprising an electro-optic material member through which a linearly polarized optical beam penetrates. At least one pair of electrodes is disposed on the electro-optic material member. The electrodes sandwich the optical path of the beam. A voltage is applied to the electrodes to generate an electric field in the electro-optic material member which acts on the beam as a lens when the electric field is generated. The optical element further comprises a unit for controlling a temperature distribution in the electro-optic material member. The temperature controlling unit is disposed on the electro-optic material member.

6 Claims, 9 Drawing Sheets

POLARIZATION DIRECTION

POLARIZATION DIRECTION

OPTICAL ELEMENT HAVING HEAT CONTROL MEANS

BACKGROUND OF THE INVENTION

1. Field of the Invention

The present invention relates to an optical element comprising a heat control means such as heat radiating fins and a Peltier element, etc.

2. Description of the Related Art

The applicant of this application proposed an optical element which is able to function as a lens with respect to an optical beam by applying an electric field to an electro-optic material (Japanese Patent Application No. 63-56766). The proposed prior application is not published yet. The present invention relates to improvements of the above-mentioned unknown prior application technique, in particular.

The optical element has a problem such that when the electric fields are not applied to the electro-optic material, the refractive index thereof changes according as its temperature changes.

Therefore, the optical characteristic of the element varies due to the temperature change, which results in that a stable lens function can not be obtained even if a constant electric field is applied to the electro-optic material.

SUMMARY OF THE INVENTION

The present invention was made considering the above-mentioned problem of the related art.

It is therefore an object of the present invention to provide an optical element having a heat controlling means in which the above-mentioned problem is effectively obviated or attenuated.

The above-mentioned object of the present invention can be achieved by an optical element having heat control means comprising:

an electro-optic material member through which a linearly polarized optical beam penetrates;

at least one pair of electrodes disposed on said member sandwiching an optical path of said beam to generate an electric field in said member which acts on said beam as a lens; and means for controlling the temperature distribution in said member, said means being disposed on said member.

The optical element in accordance with the present invention comprises an electro-optic material disposed on an optical path of a linearly polarized beam and one or more pair of electrodes disposed on the electro-optic material sandwiching the optical path.

The layout of the pair of electrodes and the shape of each electrode are determined so that the optical beam receives a desired predetermined lens function from the electro-optic material when an electric voltage is applied to the material from a voltage applying means.

In accordance with an embodiment of the present invention, the optical element comprises a heat radiating means secured on the electro-optic material by means of an adhesive agent.

In accordance with another embodiment of the present invention, the optical element comprises a temperature control means disposed on the electro-optic material. The heat control means may comprise a Peltier element, for instance. Also, the optical element may comprise a heat radiating means in addition to the heat control means as a part thereof. The heat control means may be attached to the electro-optic material by an adhesive means.

Advantages of the above-mentioned optical element are that the change of lens function due to the temperature change is effectively attenuated since the electro-optic material is effectively cooled by the heat radiating means and that the change of lens function is further effectively obviated by the heat control means which controls the temperature of the electro-optic material.

Further objects and advantages of the present invention will be apparent from the following description of the preferred embodiments of the invention as illustrated is the accompanying drawings.

BRIEF DESCRIPTION OF THE DRAWINGS

FIG. 1b is an explanatory sectional view of the optical element of FIG. 1a;

FIG. 4b is an explanatory side view of the optical device of FIG. 4a;

FIG. 4c is an explanatory graphical view of the deflection of image point of the optical device of FIG. 4a;

FIG. 5b is an explanatory side view of the optical device of FIG. 5a.

DESCRIPTION OF THE PREFERRED EMBODIMENTS

First of all, an optical element to which the present invention is related and can be applied is explained hereinafter with reference to FIGS. 1a to 1h.

Figure 1A:
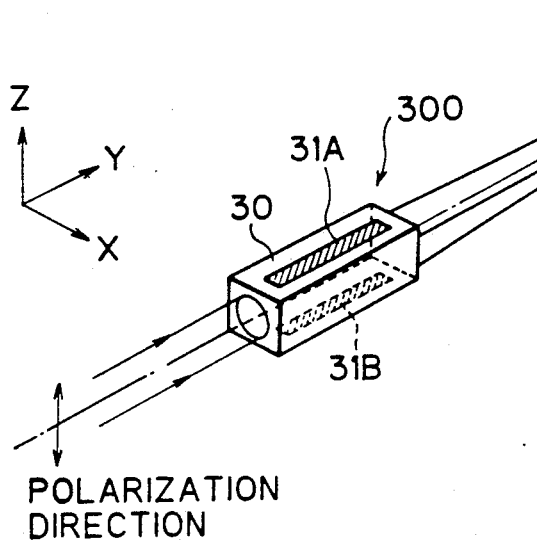
FIG. 1a is an explanatory perspective view of an example of the optical element to which the present invention is related and can be applied.

FIG. 1a illustrates an example of the optical element of the related art.

In FIG. 1a, numeral 300 designates an optical element as a whole. The optical element 300 comprises an electro-optic material member 30 and a pair of electrodes 31A and 31B arranged on the member 30.

The electro-optic material has a characteristic that when an electric field is applied to the material, the refractive index thereof changes according to the strength of the electric field. In this particular embodiment, the member 30 is made from PLZT (9/65/35) electro-optic crystal which is one of the electro-optic materials, known per se.

The member 30 is formed in a rectangular parallelepiped shape. An optical beam penetrates through the member 30 along its longitudinal direction (direction Y). The optical beam is linearly polarized in the direction Z.

Each of the electrodes 31A and 31B formed on the member 30 has a longitudinal strip shape, the longitudinal side being disposed along the direction Y. The electrodes 31A and 31B are arranged on the opposed upper and lower surfaces of the member 30 superposing with each other when seen from the direction Z.

When an electric field is applied to the member 30, the refractive index of the part of the member 30 where the electric field functions is decreased due to the electro-optic effect of the electric field. More precisely, when the electric field component Ez is applied to the member 30 in the direction Z, the refractive index Nz of the member 30 becomes $$Nz = N_0\{1-(\tfrac{1}{2})No^2 R_{33} Ez^2\}$$

wherein No represents the refractive index of the member 30 when the electric field is not applied and $R_{33}$ represents the matrix component of the seond electro-optic coefficient.

That is, when the electric field is applied, the refractive index is decreased in proportion to a square of the electric field strength.

Figure 1B:
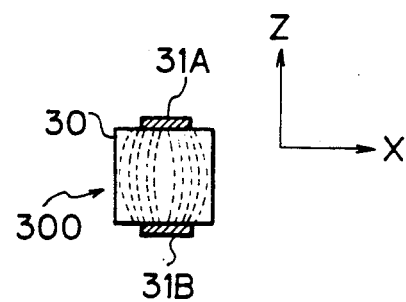

FIG. 1b illustrates the optical element 300 in the state of being acted on by the electric field which is generated by applying a voltage between the electrodes 31A and 31B. The distribution of the electric force lines generated by applying a voltage between the electrodes is represented by dash lines in FIG. 1b. The density of the electric force lines is in proportion to the electric field strength. Therefore, in the arrangement of FIG. 1b, the refractive index of the member 30 is more reduced in the vicinity of the electrodes 31A and 31B than in the central portion of the member 30 between the electrodes. Therefore, when the electric field of applied in the direction Z, the optical element 300 functions as a cylindrical lens which has a positive power only in the direction Z with respect to the optical beam penetrating through the element along the direction Y.

Accordingly, as illustrated in FIG. 1a, the optical beam which is linearly polarized in the direction Z can be converged in the direction Z by passing through the element 300 on the condition that an electric voltage is applied between the electrodes 31A and 31B.

Also, it is possible to change the converging point of the beam in the direction Y by changing the voltage applied between the electrodes.

Figure 1C:
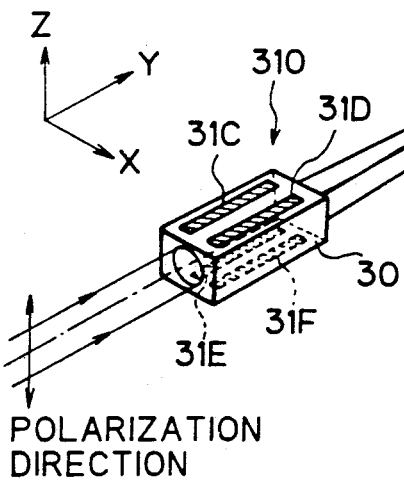
FIG. 1c is an explanatory perspective view of another example of the optical element to which the present invention is related and can be applied.
Figure 1D:
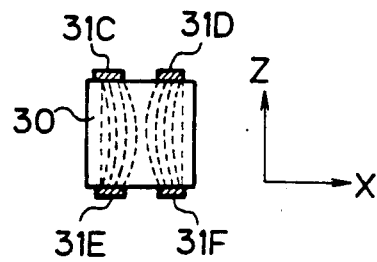
FIG. 1d is an explanatory sectional view of the optical element of FIG. 1c.

FIG. 1c illustrates another example of the optical element of the related art. The optical element 310 of this example comprises an electro-optic material member 30 and four strip shaped electrodes 31C, 31D, 31E and 31F which are disposed in parallel to each other on the opposed two surfaces of the member 30 perpendicular to the direction Z. The electrodes are arranged to form two pairs of electrodes 31C-31E and 31D-31F, the electrodes of each pair being superposed with each other when seen from the direction Z.

When a voltage is applied to the electrodes, the electrodes 31C and 31D on the same surface of the member 30 are arranged to have a potential of the same polarity while the electrodes 31E and 31F on the opposite surface are arranged to have a potential of the polarity opposite to that of the electrodes 31C and 31D. Therefore, when the voltage is applied, the electric force lines are generated as illustrated by dash lines in FIG. 1d, whereby the element 310 functions as a cylindrical lens having a positive power only in the direction X with respect to an optical beam which penetrates through the member 30 along the direction Y and linearly polarized in the direction Z.

Accordingly, as illustrated in FIG. 1c, the collimated optical beam which is linearly polarized in the direction Z is converged in the direction X by passing through the member 30 along the direction Y on the condition that the voltage is applied between the electrodes of the element 310. Also, it is possible to change the converging point of the beam along the direction Y by changing the voltage applied to the element 310.

Figure 1E:
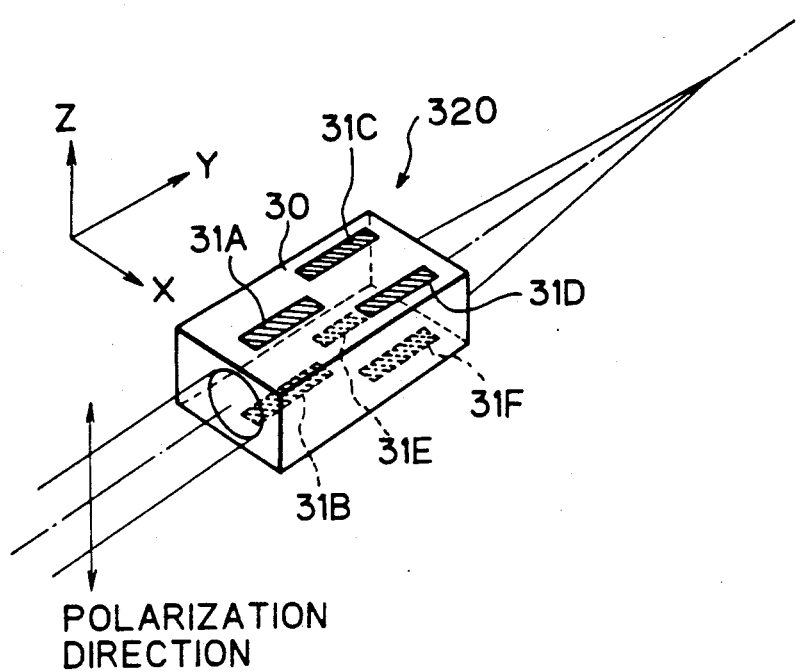
FIG. 1e is an explanatory perspective view of still another example of the optical element to which the present invention is related and can be applied.

FIG. 1e illustrates still another example of the optical element of the related art.

The optical element which is designated by numeral 320 as a whole comprises an electro-optic material member 30 and an electrode group composed of a pair of electrodes 31A and 31B which is similar to that of FIG. 1a and two pairs of electrodes 31C-31E and 31D-31F which are similar to those of FIG. 1c, the electrode pairs being combined together as illustated in FIG. 1e.

When a collimated optical beam which is linearly polarized in the direction Z is passed through the member 30 between the electrodes to which a voltage is applied, the beam is converged in the direction Z first in the front part of the member 30 which functions as a cylindrical lens having a positive power in the direction Z and then converged in the direction X in the rear part of the member 30 which functions as a cylindrical lens having a positive power in the direction X. Therefore, it becomes possible to converge the beam at one point by adjusting the convergency in the directions X and Z, respectively. Also, it becomes possible to change the converging point along the direction Y by changing the voltage applied to the electrodes.

By independently controlling the voltage applied to the electrode pair 31A-31B and the electrode pairs 31C-31E and 31D-31F, respectively, it becomes possible to independently change the converging positions in the directions X and Z, respectively.

Figure 1F:
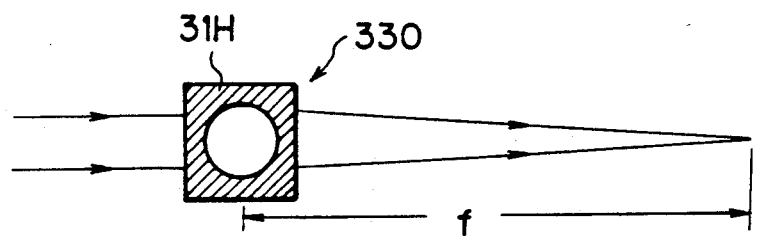
FIG. 1f is an explanatory sectional view of a further example of the optical element to which the present invention is related and can be applied.

FIG. 1f illustrates a further example of the optical element of the related art.

The optical element 330 of FIG. 1f comprises an electrode 31H having a shape such that a circle is cut away from a square shape. The counter electrode is of the same shape as the electrode 31H. By adopting such an electrode pair, the element 330 functions as a cylindrical lens having a convergency in one direction.

Figure 1G:
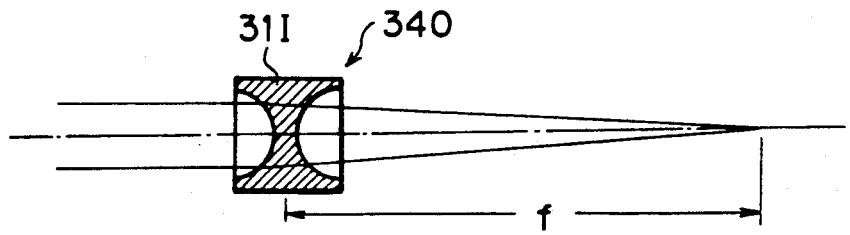
FIG. 1g is an explanatory sectional view of a still further example of the optical element to which the present invention is related and can be applied.

FIG. 1g illustrates a still further example of the optical element of the related art.

The optical element 340 of FIG. 1g comprises an electrode 31I having a shape such that semicircles are opened in the opposite sides of a square shape. The counter electrode is of the same shape as the electrode 31I. By adopting such an electrode pair, the element 340 also functions as a cylindrical lens having a convergency in one direction.

Figure 1H:
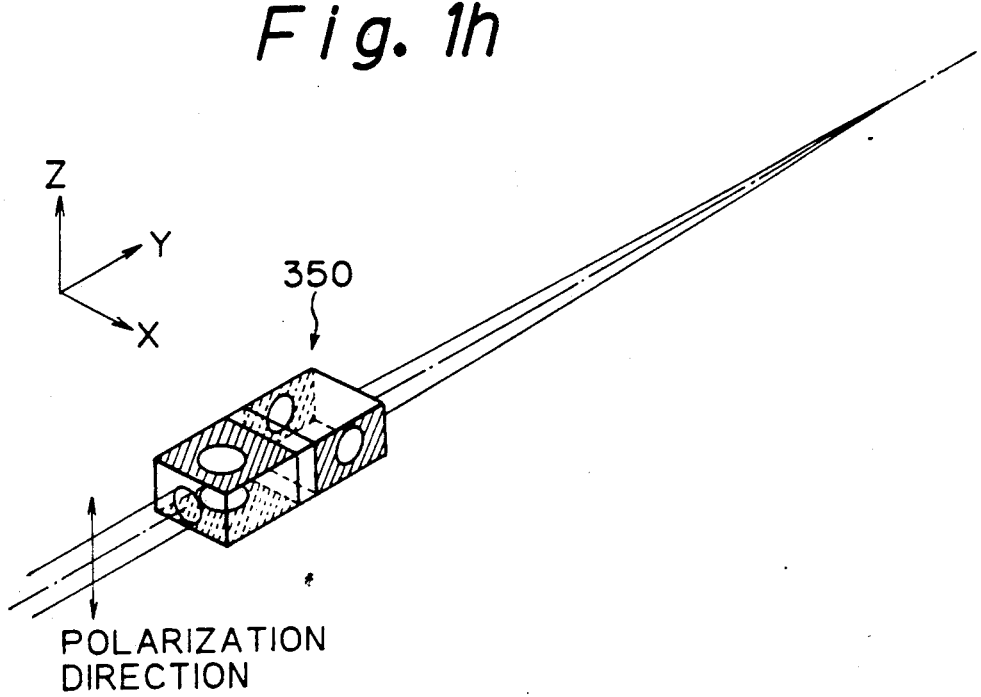
FIG. 1h is an explanatory perspective view of a still further example of the optical element to which the present invention is related and can be applied.

FIG. 1h illustrates a still further example of the optical element of the related art.

The optical element 350 of FIG. 1h is a combination of the element of FIG. 1f and the element of FIG. 1g arranged along the direction Y side by side in such a way that one of the elements of FIGS. 1f and 1g functions as a converging lens is the direction X while the other functions in the direction Z. By adopting such a structure, the element 350 functions as a lens having a convergency in two directions.

It is possible to arrange the optical element to function as a diverging lens by selecting the shape of the electrodes, layout of the electrode pair or pairs, and/or the combination of the electrode pairs instead of the convergent lenses as mentioned above.

However, the optical elements of the related art mentioned above have a problem such that the refractive index of the electro-optic material member 30 (the above-mentioned No. of the PLZT (9/65/35) electro-optic crystal) changes according to the temperature of the element during the time when the electric field is not applied to the element.

As a result, the optical characteristics of the element changes according to the temperature so that a stable lens function can not be obtained even if the strength of electric field is maintained constant.

The embodiments of the present invention were made considering the above mentioned point and effectively obviates or attenuates the problem.

Figure 2A:
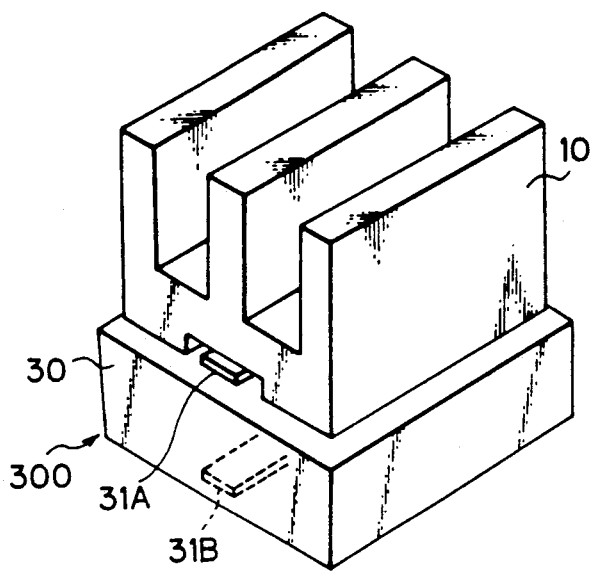
FIG. 2a is a perspective view of an embodiment of the optical element in accordance with the present invention.

FIG. 2a illustrates an embodiment of the optical element in accordance with the present invention.

In FIG. 2a numeral 300 designates an optical element as a whole. The optical element 300 comprises an electro-optic material member 30 and a pair of electrodes 31A and 31B formed on the member 30. The element 300 further comprises a heat radiating fin 10 disposed on the upper surface of the member 30. A part of the lower surface of the fin 10 is cut away to form a recess to accommodate the electrode 31A so that the electrode 31A is disconnected from the fin 10.

Figure 2B:
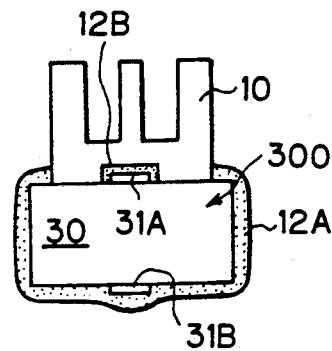
FIG. 2b is a front view of another embodiment of the optical element seen from the side of inlet end for the optical beam in accordance with the present invention.

FIG. 2b illustrates another embodiment of the present invention which is a variant of the embodiment of FIG. 2a. In this embodiment, an electric insulator 12B is filled in the space formed between the fin 10 and the electrode 31A. The outer periphery of the member 30 is also covered by an electric insulator 12A except the both ends of the member 30 which are the input and output end surfaces of the element 300.

Figure 2D:
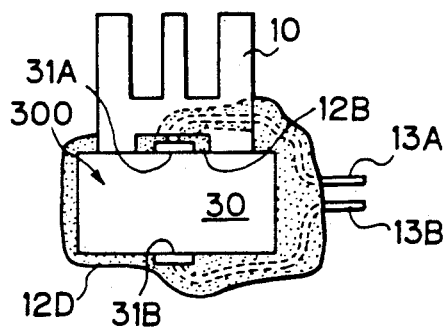
FIG. 2d is a front view of a further embodiment of the optical element seen from the side of inlet end for the optical beam in accordance with the present invention.
Figure 2C:
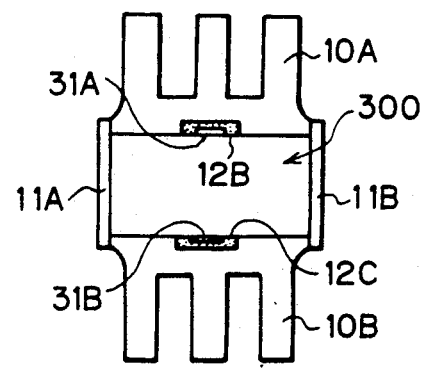
FIG. 2c is a front view of still another embodiment of the optical element seen from the side of inlet for the optical beam in accordance with the present invention.

FIG. 2c illustrates still another embodiment of the present invention. In this embodiment, a further heat radiating fin 10B is disposed on the lower surface of the member 30 in addition to the upper fin 10A. Also, heat radiating plate member 11A and 11B are attached to the both lateral sides of the member 30. The spaces between the fins 10A, 10B and the electrodes 31A, 31B are filled with the insulators 12B, 12C, respectively.

FIG. 2d illustrates still another embodiment of the present invention. This embodiment is a variant of the embodiment of FIG. 2b. The feature of this embodiment resides in that a lead wire 13A, 13B connected to each of the electrodes 31A and 31B is buried in the insulator 12D. Also, one of the lead wires 13A penetrates through a hole (not shown) formed in the fin 10 to reach the upper electrodes 31A. The hole is also filled with the insulator 12D.

In accordance with the above-mentioned embodiments of FIGS. 2a to 2d, the heat generated in the member 30 is effectively radiated from the fin 10 so that the element is sufficiently cooled, which makes it possible to stablizes the lens function of the optical element.

The heat radiating fin and the heat radiating plate member are made from, for example, metal such as aluminium which has a high heat transferring characteristic. It is desirable to dispose the electric insulating member between the electric conductive fin and the electrodes. As the material of the insulating member, ceramic is appropriate.

The essential lens function of the optical element of the present invention is to converge or diverge the optical beam in one direction (X or Z) perpendicular to the optical path (direction Y). The lens function in two directions can be realized by combining two elements of the lens function in the direction X and the lens function in the direction Z arranged in series along the direction Y. Therefore, the quality and the functionability of the lens of the optical element depends essentially on the lens function is one direction.

To avoid any influence of temperature change acting on the lens function, it is efficatious to make the temperature distribution constant in the direction perpendicular to the lens power direction and to the optical path direction.

Examples of heat radiation means for obtaining such a temperature distribution are described below with reference to FIGS. 2e to 2l. The essential feature of the embodiments is to symmetrically arrange the radiation means on the side surfaces of the electro-optic member which are perpendicular to the direction of the lens function of the optical element.

Figure 2E:
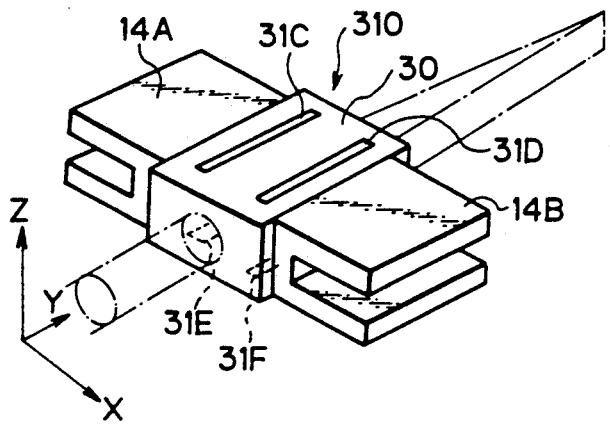
FIG. 2e is an explanatory perspective view of a still further embodiment of the optical element in accordance with the present invention.

FIG. 2e illustrates an embodiment of the present invention, which embodiment is improved from the structure of FIG. 1c. The optical element 310 comprises an electro-optic material member 30 and electrodes 31C, 31D, 31E and 31F formed on the member 30 constituting two electrode pairs. The element 310 functions as a lens in the direction X. Therefore, heat radiating fins 14A and 14B are attached to the lateral side surfaces of the member 30, which surfaces are perpendicular to the lens power direction X. The fins 14A and 14B radiate heat symmetrically from the member 30 along the optical path of the beam penetrating through the member 30.

Figure 2F:
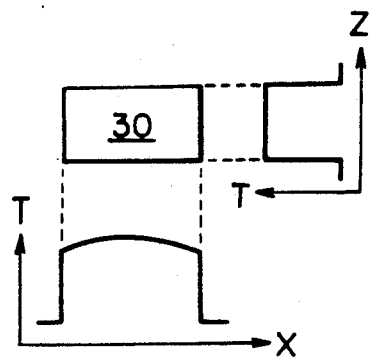
FIG. 2f is a graphical view of the temperature distribution of the optical element of FIG. 2e.

The temperature distribution of this embodiment is represented in FIG. 2f. As can be seen from the graph, the temperature distribution is constant in the direction Z which is perpendicular to the lens power direction X and to the optical path direction Y. Due to such a temperature distribution, it becomes possible to effectively prevent the influence of the temperature distribution in the member 30 from acting on the lens function in the direction X.

Figure 2G:
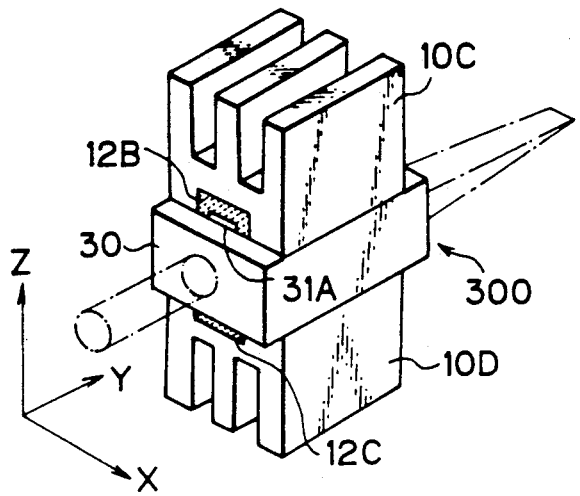
FIG. 2g is an explanatory perspective view of a still further embodiment of the optical element in accordance with the present invention.

FIG. 2g illustrates another embodiment of the present invention, which embodiment is improved from the structure of FIG. 1a. The lens power of this embodiment functions in the direction Z. Therefore, heat radiating fins 10C and 10D are attached on the upper and lower surfaces of the member 30, which surfaces are perpendicular to the lens power direction. The fins are disposed on the same surfaces as the electrodes in this embodiment. Therefore, it is desirable to fill the space between the fins 10C, 10D and the electrodes 31A, 31B with an electric insulator 12B, 12C, respectively.

Figure 2H:
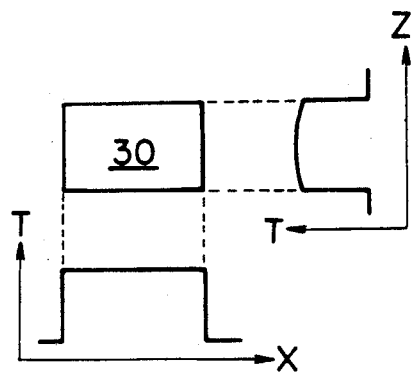
FIG. 2h is a graphical view of the temperature distribution of the optical element of FIG. 2g.

FIG. 2h represents the temperature distribution of the embodiment of FIG. 2g. As can be seen from the graph of FIG. 2h, the temperature distribution along the direction X is constant, which direction X is perpendicular to the lens power direction Z and to the optical path direction Y. Due to such a temperature distribution, it becomes possible to effectively prevent the influence of the temperature distribution in the member 30 from acting on the lens power function of the optical element in the direction Z.

Figure 2I:
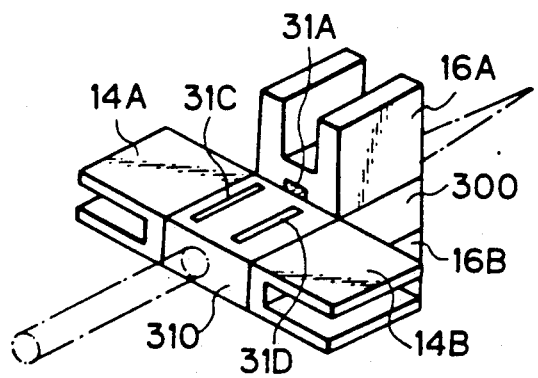
FIG. 2i is an explanatory perspective view of a still further embodiment of the optical element in accordance with the present invention.
Figure 2J:
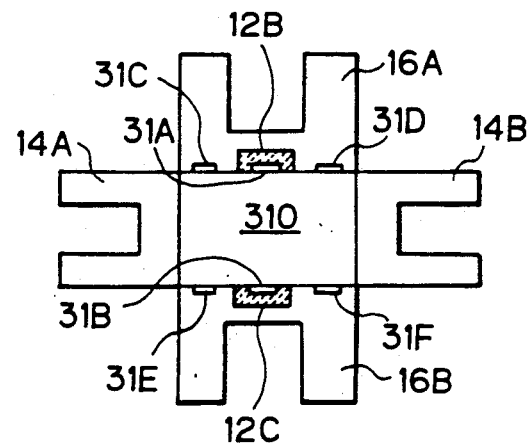
FIG. 2j is an explanatory front view of the optical element of FIG. 2i seen from the side of inlet for the optical beam.

FIG. 2i illustrates a further embodiment of the present invention. This embodiment is a combination of the structures of FIGS. 2e and 2g combined in series along the direction Y.

As illustrated in FIG. 2i, the first part of the optical element structure of this embodiment comprises an optical element 310 of FIG. 2e having fins 14A and 14B and the second part of the embodiment comprises an optical element 300 of FIG. 2g having fins 16A and 16B. Also, the space between the fin 16A, 16B and the electrode 31A, 31B is filled with electric insulation material 12B, 12C.

The temperature distribution in each of the elements 310 and 300 is similar to that of the corresponding structures of FIG. 2e. 2g and represented in FIG. 2f, 2h. Therefore, also by the structure of FIG. 2i, the influence of the temperature distribution in the optical element can be effectively prevented from acting on the lens function of the element.

Figure 2K:
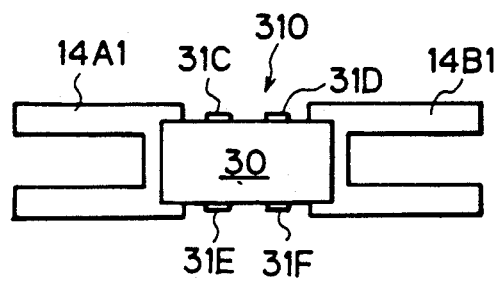
FIG. 2k is a front view of a still further embodiment of the optical element seen from the side of inlet for the optical beam in accordance with the present invention.

FIG. 2k illustrates a still further embodiment of the present invention. This embodiment is a variant of the embodiment of FIG. 2e. The feature of the embodiment of FIG. 2k resides in that each of the fins 14A1 and 14B1 radiates heat not only from the lateral side surface on which the electrodes are not formed but also from around edges of the surface on which the electrodes are formed. The temperature distribution of this embodiment is almost the same as that of FIG. 2f except that the temperature distribution line in the direction X is slightly rounded at both edges thereof.

Figure 2L:
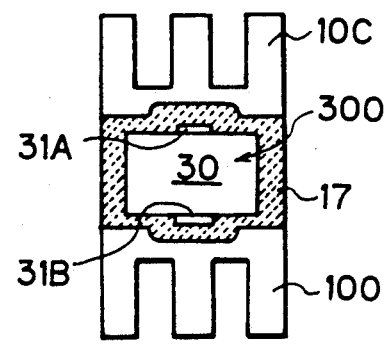
FIG. 2l is a front view of a still further embodiment of the optical element seen from the side of inlet for the optical beam in accordance with the present invention.

FIG. 2l illustrates a still further embodiment of the present invention. This embodiment is a variant of the embodiment of FIG. 2g. The feature of the embodiment of FIG. 2l resides in that the element 300 having fins 10C and 10D attached thereto is covered with electric insulating material 17 except both end surfaces thereof for inputting and outputting the optical beam. The fins are secured to the element 300 through the covering material 17.

Figure 3A:
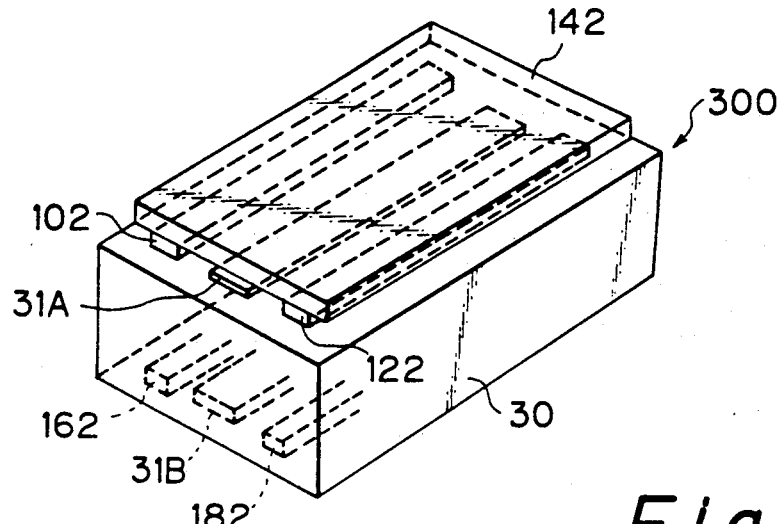
FIG. 3a is an explanatory perspective view of a still further embodiment of the optical element in accordance with the present invention.
Figure 3B:
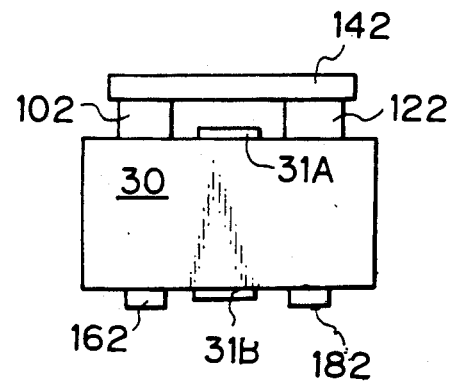
FIG. 3b is a front view of the optical element of FIG. 3a seen from the side of inlet for the optical beam.

FIG. 3a illustrates a still further embodiment of the present invention. This embodiment is improved from the structure of FIG. 1a. The optical element 300 comprises an electro-optic material member 30 and a pair of electrodes 31A and 31B disposed on the member 30. FIG. 3a is a perspective view of the embodiment and FIG. 3b is an elevational view seen from one end side of the member 30 through which end the optical beam passes. Two Peltier elements 102 and 122 for controlling temperature are disposed on the upper surface of the member 30 in parallel with the electrode 31A in both sides thereof symmetrically with respect to the electrode 31A, respectively.

On the other hand, on the lower surface of the member 30 on which surface the electrode 31B is formed, two thermo-sensors 162 and 182 are disposed in parallel with the electrode 31B in both sides thereof symmetrically with respect to the electrode 31B, respectively.

Numeral 142 designates a support member which holds the Peltier elements 102 and 122 and also functions as a radiator for radiating heat generated from the elements 102 and 122.

Figure 3C:
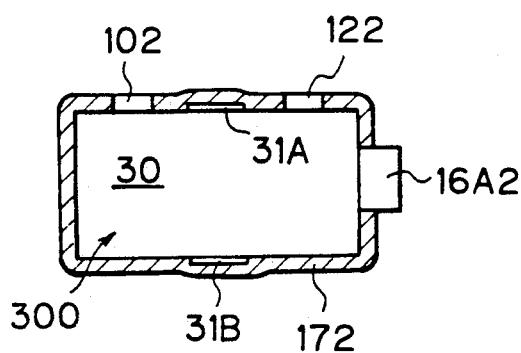
FIG. 3c is a front view of a still further embodiment of the optical element seen from the side of inlet for the optical beam in accordance with the present invention.

FIG. 3c illustrates a still further embodiment of the present invention. The optical element 300 of this embodiment comprising the member 30 and the pair of electrodes 31A and 31B is also provided with the Peltier elements 102 and 122 and a thermo-sensor 16A2. The member 30 is coated with an outer covering material 172 except for the portions of both ends thereof, the elements 102 and 122 and the thermo-sensor 16A2. The material 172 is an electric insulating material, for example, ceramic.

Figure 3D:
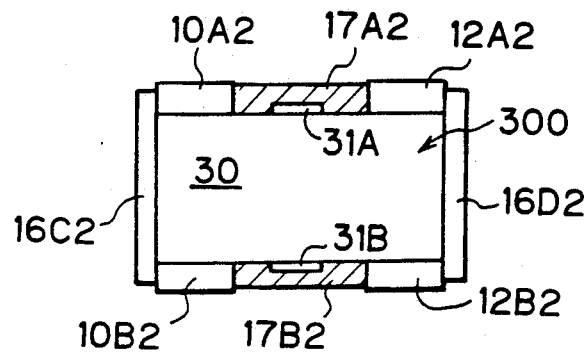
FIG. 3d is a front view of a still further embodiment of the optical element seen from the side of inlet for the optical beam in accordance with the present invention.

FIG. 3d illustrates a still further embodiment of the present invention. In this embodiment, on the upper surface of the member 30, two Peltier elements 10A2 and 12A2 are disposed sandwiching the electrode 31A and further Peltier elements 10B2 and 12B2 are disposed on the lower surface of the member 30 sandwiching the electrode 31B. Thermo-sensors 16C2 and 16D2 are attached to the lateral side surfaces of the member 30. The space between the elements 10A2 and 12A2 is filled with an electric insulating material 17A2. Also, the space between the elements 10B2 and 12B2 is filled with an electric insulating material 17B2.

In accordance with the embodiments of FIGS. 3a to 3d, mentioned above, the temperature of the member 30 is controlled to be within a predetermined range by such a way that the temperature of the member 30 is detected by the thermo-sensor and the Peltier elements are driven to control the temperature by a control circuit in response to the detection result from the thermo-sensor. It is possible to use a Peltier element control device for temperature control of LD known per se as the above-mentioned control circuit.

It is desirable to control the temperature in such a way that, for the same reason as explained with reference to the embodiments of FIGS. 2e to 2l, the temperature distribution becomes constant along the direction perpendicular to the lens power direction.

Embodiments having such a temperature control arrangement are described below with reference to FIGS. 3e to 3l. The essential feature of the arrangement is, as in the case of the embodiments of FIGS. 2e to 2l, to symmetrically control the temperature of the electro-optic member surface which is perpendicular to the direction of the lens power function of the member. The arrangement includes a heat radiating fin as a part of the heat control means.

Figure 3E:
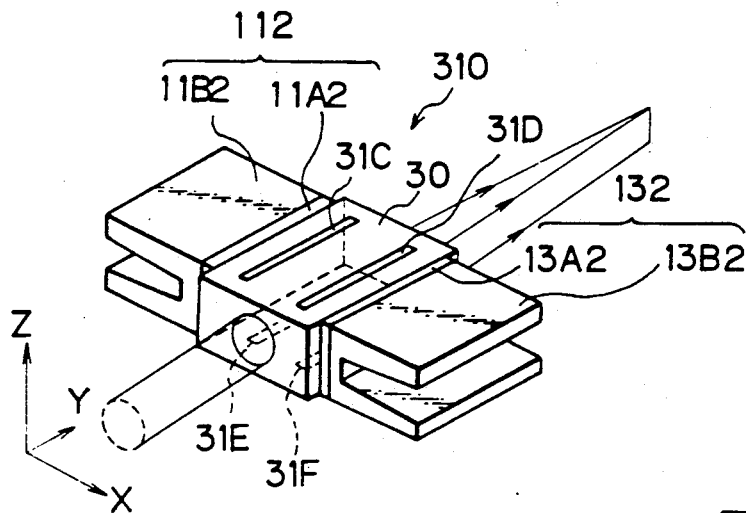
FIG. 3e is an explanatory perspective view of a still further embodiment of the optical element in accordance with the present invention.

FIG. 3e illustrates an embodiment of the present invention having the above-mentioned heat control arrangement. This embodiment is improved from the structure of FIG. 1c. The optical element 310 comprises an electro-optic material member 30 and two pairs of electrodes 31C-31E and 31D-31F formed on the member 30. The element 310 functions as a lens in the direction X. Therefore, the lateral side surfaces of the member 30 are the surfaces which are perpendicular to the direction of the lens power function. Therefore, a thermo-control arrangement 112, 132 is disposed on each lateral side surface of the member 30. Each arrangement 112, 132 comprises a Peltier element 11A2, 13A2 and a heat radiating fin 11B2, 13B2.

Figure 3F:
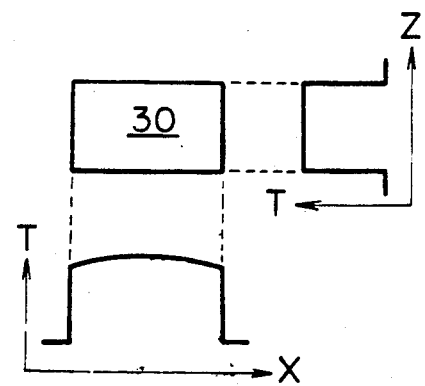
FIG. 3f is a graphical view of the temperature distribution of the optical element of FIG. 3e.

FIG. 3f represents the temperature distribution of the arrangement of FIG. 3e. As can be seen from the graph, the temperature T of the member 30 in the direction Z perpendicular to the lens powr direction X is constant, which makes it possible to effectively prevent the influence of the temperature from acting on the lens power function in the direction X.

Figure 3G:
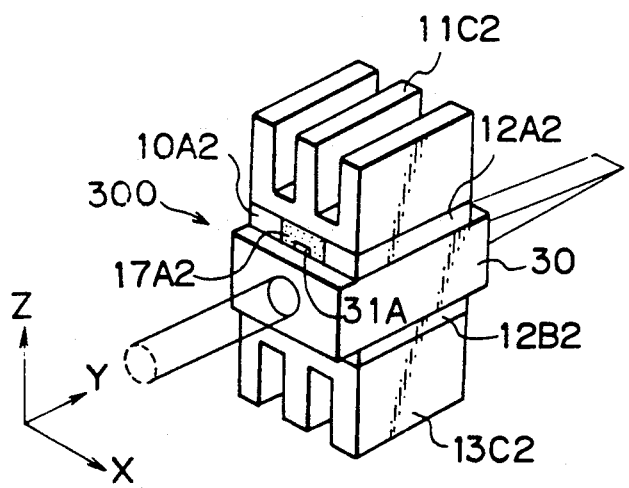
FIG. 3g is an explanatory perspective view of a still further embodiment of the optical element in accordance with the present invention.

FIG. 3g illustrates another embodiment of the present invention. This embodiment is improved from the structure of FIG. 1a. The optical element 300 of this embodiment functions as a lens in the direction Z. Therefore, the upper and lower surfaces of the member 30 become the surfaces which are perpendicular to the lens power direction. Therefore, a thermo-control arrangement is provided on each of the upper and lower surfaces of the member 30 along with the electrodes 31A and 31B. The upper arrangement comprises two Peltier elements 10A2 and 12A2 and a heat radiating fin 11C2. The lower arrangement comprises two Peltier elements (only 12B2 is seen) and a heat radiating fin 13C2. The layout of the Peltier elements is the same as that of FIG. 3d. Also, the space between the Peltier elements on each surface is filled with an electric insulating material 17A2.

Figure 3H:
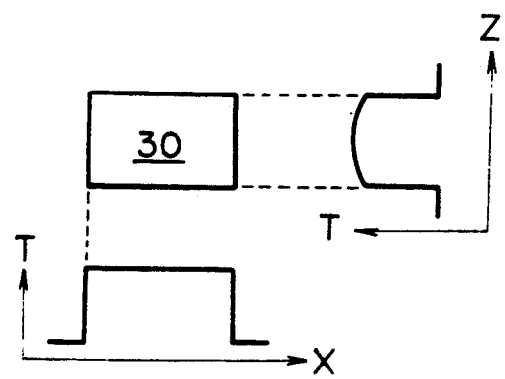
FIG. 3h is a graphical view of the temperature distribution of the optical element of FIG. 3g.

The temperature distribution of this embodiment of FIG. 3g is represented in FIG. 3h wherein the temperature is constant in the direction X, which makes it possible to effectively prevent the temperature influence from acting on the lens power function in the direction Z.

Figure 3I:
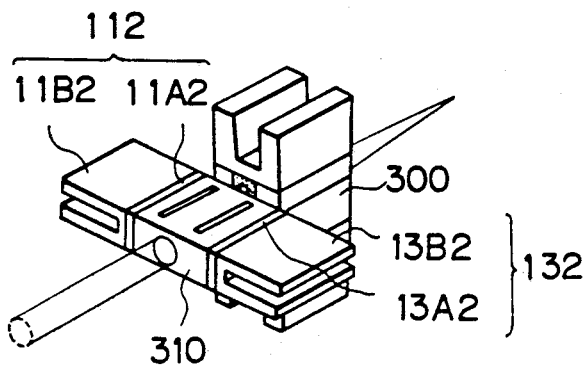
FIG. 3i is an explanatory perspective view of a still further embodiment of the optical element in accordance with the present invention.

FIG. 3i illustrates a further embodiment of the present invention. This embodiment is a combination of the embodiments of FIGS. 3e and 3g arranged in series along the direction Y.

Figure 3J:
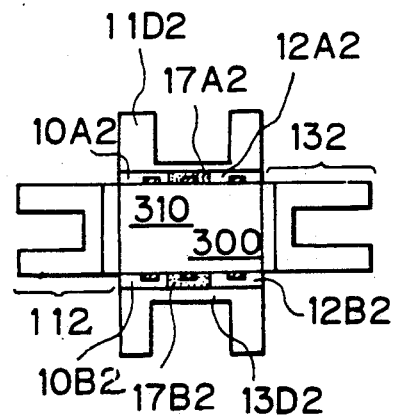
FIG. 3j is an explanatory front view of the optical element of FIG. 3i seen from the side of inlet for the optical beam.

The first optical element 310 is provided with thermo-control arrangement 112 and 132 disposed on the right and left lateral side surfaces of the electro-optic member, as the embodiment of FIG. 3e. The second optical element 300 is provided with an upper thermo-control arrangement comprising Peltier elements 10A2 and 12A2 and a heat radiating fin 11D2 and a lower thermo-control arrangement comprising Peltier elements 10B2 and 12B2 and a heat radiating fin 13D2, as illustrated in FIG. 3j which is a front view of the embodiment of FIG. 3i seen from the optical beam inlet end side of the element. The space between the Peltier elements on each of the upper and lower surfaces is filled with an electric insulation material 17A2, 17B2.

The temperature distribution in each element 310, 300 is substantially the same as that of corresponding structure represented in FIG. 3f, 3h. By this combination arrangement, it also becomes possible to effectively and reliably achieve the lens function of the optical element.

Figure 3K:
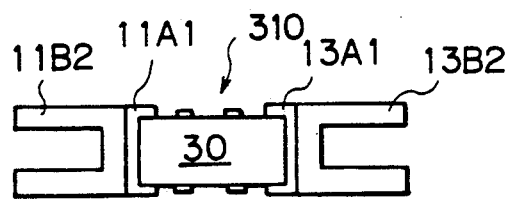
FIG. 3k is a front view of a still further embodiment of the optical element seen from the side of inlet for the optical beam in accordance with the present invention.

FIG. 3k illustrates a still further embodiment of the present invention. This embodiment is a variant of the embodiment of FIG. 3e. The feature of the embodiment of FIG. 3k resides in that the Peltier elements 11A1 and 13A1 are arranged to cover not only the lateral side surfaces of the member 30 but also a part of edges of the upper and lower surfaces of the member 30. The temperature distribution of this embodiment is almost the same as that of FIG. 3f except that the distribution line of the embodiment of FIG. 3k in the direction X is slightly rounded at each edge of the member 30.

Figure 3L:
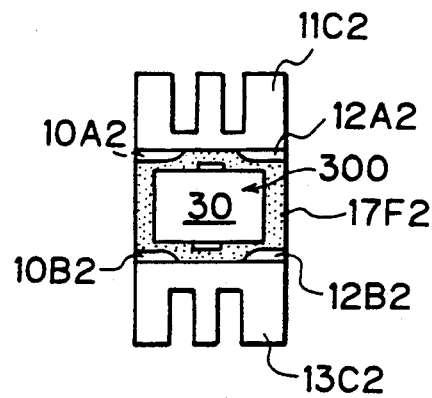
FIG. 3l is a front view of a still further embodiment of the optical element seen from the side of inlet for the optical beam in accordance with the present invention.

FIG. 3l illustrates a still further embodiment of the present invention. This embodiment is a variant of the embodiment of FIG. 3g. The feature of the embodiment of FIG. 3l resides in that the periphery of the electro-optic material member 30 is covered by an electric insulating material 17F2 such as ceramic except for its both end surfaces through which the optical beam passes. The thermo-control arrangements (fins 11C2 and 13C2) are secured to the member 30 through the cover material 17F2.

Two examples of the optical device to which the present invention can be applied are described hereinafter.

Figure 4A:
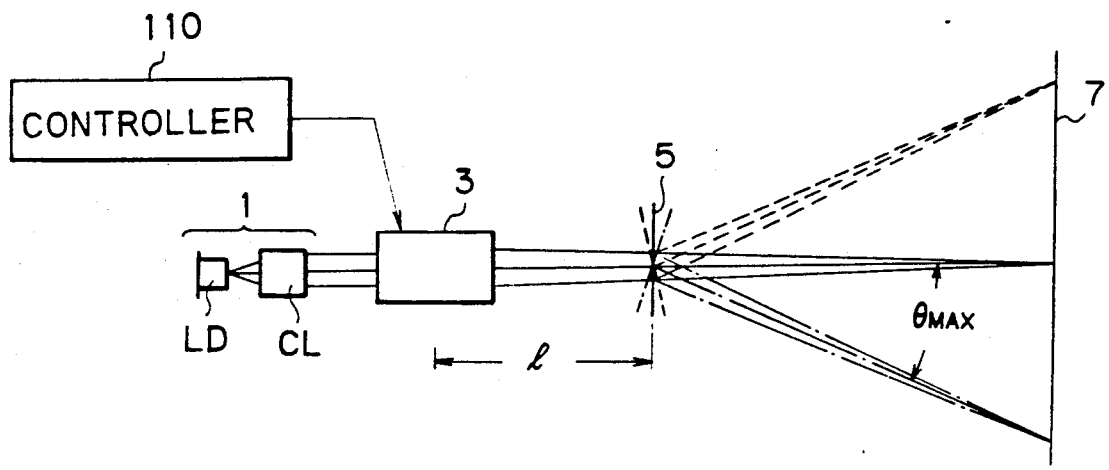
FIG. 4a is an explanatory plan view of an example of the optical device using the optical element of the present invention.
Figure 4B:
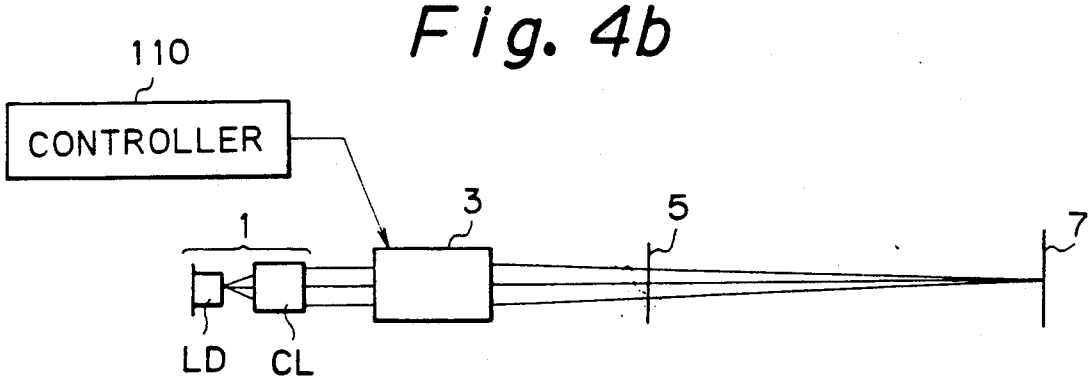

FIGS. 4a and 4b illustrate an example of the optical device to which the invention can be applied as seen from the upper side and lateral side of the device, respectively.

Numeral 1 designates an optical source which comprises a semiconductor laser diode device LD and a collimator lens CL. Numeral 3 designates an optical element in accordance with the present invention (for example, the embodiment corresponding to the structure of FIG. 1e). Numeral 5 designates a deflection mirror surface of a rotary polygon mirror. Numeral 7 designates a surface to be scanned.

FIG. 4a is a plan view of the device so that the line of main scanning (horizontal scanning) is represented vertically on the scanning surface 7 in the drawing.

FIG. 4b is a side view of the device so that the line of sub-scanning (vertical scanning) is represented vertically on the scanning surface 7 in the drawing.

The laser beam output from the laser source LD is arranged to be polarized in the direction of vertical scanning. Therefore, the direction of the electric field applied to the optical element 3 is arranged to be coincident with the vertical scanning direction.

The collimated laser beam polarized in the vertical scanning direction is introduced into the optical element 3 from the optical source 1. In this state, a voltage is applied to the electrodes of the element 3 so that the laser beam output from the element 3 is converged to one point. By adjusting the voltage, it is possible to change the position of the convergent point. That is, the element 3 has the same power in the horizontal and vertical scanning directions, which power can be changed by controlling the voltage to be applied to the electrodes. The voltage is controlled by a control unit 110 comprising a micro-computer, for instance.

Figure 4C:
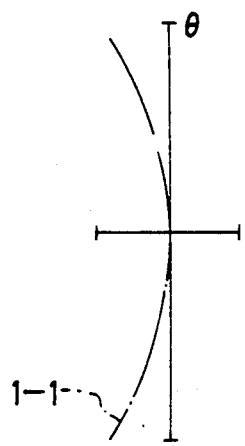

By adjusting the voltage applied to the element 3, it becomes possible to converge the laser beam to a central point on the horizontal scanning line on the scanning surface 7 to form a converged spot thereon, as illustrated in FIG. 4a. In this state, the beam is deflected to scan the surface 7 by the deflection means (mirror 5). However, in the event that the beam is deflected as it is, the locus of the convergent point thereof trails as represented by a circular arc line 1—1 in FIG. 4c, which results in a curvature of field on the scanning line so that the spot diameter increases according as the deflection angle $\theta$ increases in both of horizontal and vertical scanning directions on the scanning surface 7.

The curvature of field is represented as a function of the deflection angle $\theta$ by $$(f_o - 1)\{(1/\cos\theta) - 1\}$$

wherein $f_o$ represents the focal length of the element 3 in the above-mentioned state and 1 represents the distance between the deflection mirror 5 and the element 3. It is to be noted that since the incident angle of the beam to the element 3 is always zero, the above-mentioned formula can be commonly applied to the horizontal and vertical scanning directions.

Such a curvature of field has to be removed. The curvature of field can be removed by changing the focal length of the element 3 by adjusting the voltage to be applied to the element 3 so that the convergent point is always located on the scanning surface 7 irrespective of the deflection angle $\theta$. More specifically, the curvature of field can be corrected by changing the focal length $f(\theta)$ according as the change of the deflection angle $\theta$ as represented by the following equation.

$$f(\theta) = (f_o - 1)(1/\cos\theta) + 1 \qquad (1)$$

When the focal length change is determined from the equation (1), the voltage $V(\theta)$ to be applied to the element 3 in relation to the deflection angle $\theta$ can be determined on the basis of the focal length change.

On the other hand, the deflection angle $\theta$ in the optical scanning operation is determined in relation to the synchronizing clock to synchronize with the optical scanning motion. Therefore, it becomes possible to remove the curvature of field on the scanning surface by memorizing in advance the data of the above-mentioned voltage $V(\theta)$ in relation to the synchronizing clock in a memory of the control unit 110 so that the necessary voltage is read from the memory and applied to the element 3 by the control unit 110 in response to the synchronizing clock.

Due to such an arrangement, it becomes possible to make the convergent spot diameter stably constant on the scanning surface 7.

In accordance with the structure of FIG. 2i or 3i applied to the above-mentioned optical device, heat generated from the electro-optic member of the element 3 is sufficiently radiated or thermally controlled so that it becomes possible to effectively prevent the influence of the heat change from acting on the lens function of the element 3.

Figure 5A:
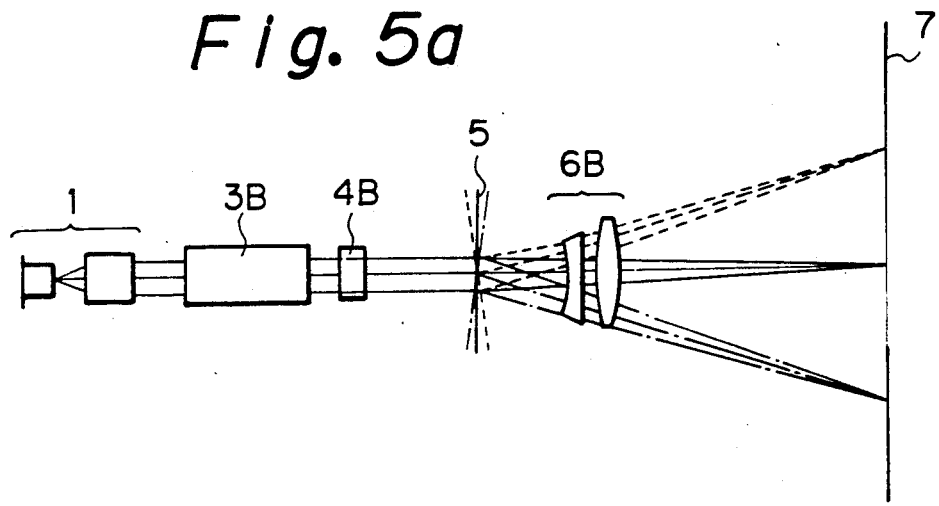
FIG. 5a is an explanatory plan view of another example of the optical device using the optical element of the present invention.
Figure 5B:
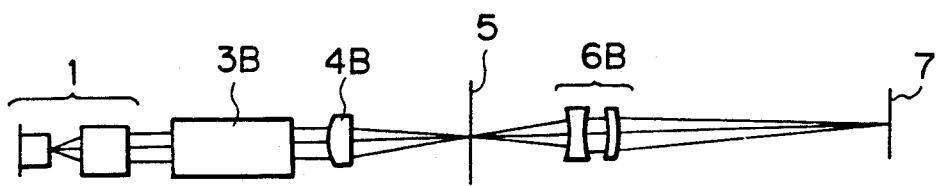

FIGS. 5a and 5b illustrate another example of the optical device to which the present invention can be applied.

The optical device comprises an optical element 3B which has the structure improved from the structure of FIG. 1a or 1c.

Reference 4B designates a cylindrical lens. Numeral 5 designates a deflection mirror surface of a rotary polygon mirror. Reference 6B designates an anamorphic $f\theta$ lens assembly and numeral 7 designates a surface to be scanned.

FIG. 5a is a plan view of the device so that the scanning line of the main scanning (horizontal scanning) is represented vertically on the scanning surface 7 in the drawing sheet.

FIG. 5b is a side view of the device so that the scanning line of the sub-scanning (vertical scanning) is represented vertically on the scanning surface 7 in the drawing sheet.

The semiconductor laser source LD emits a laser beam which is arranged to be polarized in the vertical scanning direction. Therefore, the electric field is applied to the optical element 3B in the direction of vertical scanning.

The element 3B has a lens power in the vertical scanning direction. The magnitude of the power can be changed by controlling the voltage applied to the element 3B. The voltage is controlled by a (not shown) control means. The cylindrical lens 4B also has a positive lens power in the vertical scanning direction.

As can be seen from FIGS. 5a and 5b, by adjusting the voltage applied to the element 3B, the beam from the laser source 1 is converged on the mirror surface 5 as a line image longitudinal in the horizontal scanning direction due to the function of the element 3B and the lens 4B. The $f\theta$ lens 6B converges the beam deflected by the mirror 5 on the scanning surface 7 as a spot of the beam. The $f\theta$ lens 6B is composed of an anamorphic lens assembly which has a stronger power in the vertical scanning direction than in the horizontal scanning direction. Therefore, in the event that the beam is used to scan the surface 7 as it is, it is apt to generate the curvature of field in the vertical scanning direction so that the spot diameter changes according to the scanning position in the vertical scanning motion.

To correct such a curvature of field in the vertical scanning direction, the voltage applied to the element 3B is adjusted to synchronize with the scanning motion.

By controlling the voltage, it becomes possible to maintain the spot diameter stably constant and achieve a reliable scanning operation.

Either by radiating heat from the element 3B by an appropriate one of arrangements of FIGS. 2a to 2g, 2k and 2l, or by controlling the temperature of the element 3B by an appropriate one of arrangements of FIGS. 3a to 3e and 3g to 3l, it becomes possible to achieve a stable and reliable lens function irrespective of temperature change of the optical element.

The present invention can also be applied to the optical devices having means for correcting the curvature of field with the use of the optical element of various kind proposed in Japanese Patent Application No. 1-115778 of the present applicant.

As mentioned above, the present invention provides a novel optical element. The optical element in accordance with the present invention can achieve a reliable lens function by effectively obviating or attenuating the problem of influence of temperature change which acts on the lens function of the optical element.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical element having heat control means comprising:
    an electro-optic material member through which a linearly polarized optical beam penetrates;
    at least one pair of electrodes disposed on said member sandwiching an optical path of said beam to generate an electric field in said member which acts on said beam as a lens; and
    means for controlling the temperature distribution in said member, said means being disposed on said member.

2. An optical element having heat control means according to claim 1, wherein said electro-optic material member is formed as a rectangular parallelepiped.

3. An optical element having heat control means according to claim 2, wherein said temperature distribution controlling means is disposed on a surface of said member which surface is perpendicular to the direction of the lens function of said member.

4. An optical element having heat control means according to claim 1, wherein said temperature distribution controlling means comprises a heat radiating fin.

5. An optical element having heat control means according to claim 1, wherein said temperature distribution controlling means comprises a Peltier element and thermo-sensor.

6. An optical element having heat control means according to claim 1, wherein said temperature distribution controlling means is so arranged that the temperature of said member along the direction perpendicular to the direction of the lens function thereof and to the optical path of said beam becomes constant.

* * * * *